US012633302B2

(12) United States Patent
Qian et al.

(10) Patent No.: US 12,633,302 B2
(45) Date of Patent: May 19, 2026

(54) SELF-SUPERVISED SPEECH REPRESENTATIONS BY DISENTANGLING SPEAKERS

(71) Applicant: INTERNATIONAL BUSINESS MACHINES CORPORATION, Armonk, NY (US)

(72) Inventors: Kaizhi Qian, Champaign, IL (US); Yang Zhang, Cambridge, MA (US); Chuang Gan, Cambridge, MA (US); Dakuo Wang, Cambridge, MA (US); Bo Wu, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 613 days.

(21) Appl. No.: 18/053,056

(22) Filed: Nov. 7, 2022

(65) Prior Publication Data

US 2024/0170007 A1 May 23, 2024

(51) Int. Cl.
*G10L 25/30* (2013.01)
*G10L 21/0272* (2013.01)

(52) U.S. Cl.
CPC .......... *G10L 25/30* (2013.01); *G10L 21/0272* (2013.01)

(58) Field of Classification Search
None
See application file for complete search history.

(56) References Cited

U.S. PATENT DOCUMENTS 11,295,762 B2 4/2022 Qian
11,996,083 B2 5/2024 Qian et al.
2021/0142120 A1 5/2021 Min
2021/0327460 A1* 10/2021 Qian .......................... G10L 25/30
2022/0059071 A1* 2/2022 Pearce ............... H04N 21/4788
2022/0189456 A1 6/2022 Pang

FOREIGN PATENT DOCUMENTS

WO WO-2023192327 A1 * 10/2023 ............ G10L 25/30

OTHER PUBLICATIONS

Hsu et al., "HuBERT: Self-Supervised Speech Representation Learning by Masked Prediction of Hidden Units", Jun. 14, 2021 (Year: 2021), arXiv:2106.07447v1, pp. 1-10.*

(Continued)

*Primary Examiner* — Antim G Shah
(74) *Attorney, Agent, or Firm* — Lily Neff

(57) ABSTRACT

A method, computer system and computer program product is presented for providing a self-supervised speech representation. In one embodiment, audio input is received including speech utterances. A label sequence is generated from these speech utterances by a teacher label generator. A speech representation is generated of a partially masked version of the speech utterance using a speech representation network. The speech utterance is passed into two random transformations that alter only speaker information prior to the partial masking. A predictor will then predict the label sequence. In one embodiment performance-based assessment is made on a cross-entropy loss between the generated label sequence and a predicted label sequence.

20 Claims, 4 Drawing Sheets

(56) References Cited

OTHER PUBLICATIONS

Grace Period Disclosure: "Contentvec: An Improved Self-Supervised Speech Representation by Disentangling Speakers", Kaizhi Qian, Yang Zhang , Heting Gao, Junrui Ni, Cheng-I Jeff Lai, David Cox, Mark Hasegawa Johnson, Shiyu Chang, arXiv:2204.09224v2 [cs.SD] Jun. 23, 2022, https://arxiv.org/pdf/2204.09224.pdf, 15 pages.
Huang et al., "S3PRL-VC: Open-Source Voice Conversion Framework with Self-Supervised Speech Representations," ICASSP 2022-2022 IEEE International Conference on Acoustics, Speech and Signal Processing (ICASSP), IEEE, Downloaded Aug. 31, 2022, pp. 6552-6556.
Lin et al., "S2VC: A Framework for Any-to-Any Voice Conversion with Self-Supervised Pretrained Representations," arXiv:2104.02901v2 [eess.AS] Jun. 14, 2021, https://arxiv.org/pdf/2104.02901.pdf, 5 pages.
Wang et al., "Self-Supervised Learning for Speech Recognition With Intermediate Layer Supervision," arXiv:2112.08778v1 [eess.AS] Dec. 16, 2021, https://arxiv.org/pdf/2112.08778.pdf, 8 pages.
Baevski, et al., vq-wav2vec: Self-Supervised Learning of Discrete Speech Representations, arXiv:1910.05453v3 [cs.CL] Feb. 16, 2020, 12 pages.
Baevski, et al., wav2vec 2.0: A Framework for Self-Supervised Learning of Speech Representations, arXiv:2006.11477v3 [cs.CL], Oct. 22, 2020, 19 pages.
Chen, et al., A Simple Framework for Contrastive Learning of Visual Representations, arXiv:2002.05709v3 [cs.LG], Jul. 1, 2020, 20 pages.
Chen, et al., Again-VC: A One-shot Voice Conversion using Activation Guidance and Adaptive Instance Normalization, arXiv:2011.00316v1 [eess.AS] , Oct. 31, 2020, 5 pages.
Choi, et al., Neural Analysis and Synthesis: Reconstructing Speech from Self-Supervised Representations, arXiv:2110.14513v2 [cs.SD] , Oct. 28, 2020, 19 pages.
Choi, et al., StarGAN: Unified Generative Adversarial Networks for Multi-Domain Image-to-Image Translation, IEEE/CVF Conference on Computer Vision and Pattern Recognition, 2018, pp. 8789-8797.
Chou, et al., Multi-target Voice Conversion without Parallel Data by Adversarially Learning Disentangled Audio Representations, arXiv:1804.02812v2 [eess.AS] , Jun. 24, 2018, 6 pages.
Chou, et al., One-shot Voice Conversion by Separating Speaker and Content Representations with Instance Normalization, arXiv:1904.05742v4 [cs.LG] , Aug. 22, 2019, 6 pages.
Chung, et al., An Unsupervised Autoregressive Model for Speech Representation Learning, arXiv:1904.03240v2 [cs.CL], Jun. 19, 2019, 5 pages.
Chung, et al., Generative Pre-Training for Speech with Autoregressive Predictive Coding, arXiv:1910.12607v2 [eess.AS], Jan. 26, 2020, 5pages.
Chung, et al., W2v-BERT: Combining Contrastive Learning and Masked Language Modeling for Self-Supervised Speech Pre-Training, arXiv:2108.06209v2 [cs.LG], Sep. 13, 2021, 7 pages.
Dunbar, et al., The Zero Resource Speech Challenge 2021: Spoken Language Modelling, Interspeech, Aug. 9, 2021, 6 pages.
Eide, et al., A Parametric Approach to Vocal Tra?t Length Normalization, In ICASSP, 1996, pp. 346-349.
Heigold, et al., End-To-End Text-Dependent Speaker Verification, IEEE International Conference on Acoustics, Speech and Signal Processing (ICASSP), 2016, pp. 5115-5119.
Hsu, et al., Voice Conversion from Non-parallel Corpora Using Variational Auto-encoder, arXiv:1610.04019v1 [stat.ML], Oct. 13, 2016, 6 pages.
Ito, et al., The LJ Speech Dataset, Retrieved from: https://keithito.com/LJ-Speech-Dataset/, 2017, 5 pages.
Kameoka, et al., ACVAE-VC: Non-Parallel Many-To-Many Voice Conversion With Auxiliary Classifier Variational Autoencoder, arXiv:1808.05092v3 [stat.ML], Oct. 10, 2020, 7 pages.
Kameoka, et al., StarGAN-VC: Non-Parallel Many-To-Many Voice Conversion With Star Generative Adversarial Networks, arXiv:1806.02169v2 [cs.SD], Jun. 29, 2018, 2017, 9 pages.
Kaneko, et al., CycleGAN-VC: Non-parallel Voice Conversion Using Cycle-Consistent Adversarial Networks, In 26th European Signal Processing Conference (EUSIPCO), 2018, pp. 2100-2104.
Kaneko, et al., CycleGAN-VC2: Improved CycleGAN-based Non-parallel Voice Conversion, arXiv:1904.04631v1 [cs.SD], Apr. 9, 2019, 5 pages.
Kaneko, et al., StarGAN-VC2: Rethinking Conditional Methods for StarGAN-Based Voice Conversion, arXiv:1907.12279v2 [cs.SD], Aug. 7, 2019, 5 pages.
Kharitonov, et al., Data Augmenting Contrastive Learning of Speech Representations in the Time Domain, arXiv:2007.00991v1 [eess.AS], Jul. 2, 2020, 6 pages.
Kong, et al., HiFi-GAN: Generative Adversarial Networks for Efficient and High Fidelity Speech Synthesis, arXiv:2010.05646v2 [cs.SD], Oct. 23, 2020, 14 pages.
Lakhotia, et al., Generative Spoken Language Modeling from Raw Audio, arXiv:2102.01192v2 [cs.CL], Sep. 9, 2021, 20 pages.
Lee, et al., VoiceMixer: Adversarial Voice Style Mixup, 35th Conference on Neural Information Processing Systems, 2021, 15 pages.
Ling, et al., DeCoAR 2.0: Deep Contextualized Acoustic Representations with Vector Quantization, arXiv:2012.06659v1 [eess.AS], Dec. 11, 2020, 5 pages.
Liu, et al., Mockingjay: Unsupervised Speech Representation Learning with Deep Bidirectional Transformer Encoders, arXiv:1910.12638v2 [eess.AS], Feb. 2, 2020, 5 pages.
Liu, et al., Tera: Self-Supervised Learning of Transformer Encoder Representation for Speech, In IEEE/ACM Transactions on Audio, Speech, and Language Processing, Jul. 2021, 15 pages.
Oord, et al., Neural Discrete Representation Learning, In NIPS, 2017, 10 pages.
Oord, et al., Representation Learning with Contrastive Predictive Coding, arXiv:1807.03748v2 [cs.LG], Jan. 22, 2019, 13 pages.
Ott, et al., Fairseq: A Fast, Extensible Toolkit for Sequence Modeling, IEEE International Conference on Acoustics, Speech and Signal Processing (ICASSP), arXiv:1904.01038v1 [cs.CL], Apr. 1, 2019, 6 pages.
Panayotov, et al., Librispeech: An Asr Corpus Based on Public Domain Audio Books, IEEE International Conference on Acoustics, Speech and Signal Processing (ICASSP), 2015, pp. 5206-5210.
Pascual, et al., Learning Problem-agnostic Speech Representations from Multiple Self-supervised Tasks, arXiv:1904.03416v1 [cs.LG] Apr. 6, 2019, 5 pages.
Polyak, et al., Speech Resynthesis from Discrete Disentangled Self-Supervised Representations, arXiv:2104.00355v3 [cs.SD], Jul. 27, 2021, 5 pages.
Qian, et al., AUTOVC: Zero-Shot Voice Style Transfer with Only Autoencoder Loss, arXiv:1905.05879v2 [eess.AS], Jun. 6, 2019, 12 pages.
Qian, et al., F0-Consistent Many-To-Many Non-Parallel Voice Conversion Via Conditional Autoencoder , arXiv:2004.07370v1 [eess.AS], Apr. 15, 2020, 5 pages.
Qian, et al., Unsupervised Speech Decomposition via Triple Information Bottleneck, arXiv:2004.11284v6 [eess.AS], Mar. 13, 2021, 16 pages.
Ravanelli, et al., Multi-Task Self-Supervised Learning for Robust Speech Recognition, arXiv:2001.09239v2 [eess.AS], Apr. 17, 2020, 5 pages.
Riviere, et al., Towards Unsupervised Learning of Speech Features in the Wild, IEEE Spoken Language Technology Workshop (SLT), Dec. 15, 2020, pp. 156-163.
Schneider, et al., WAV2VEC: Unsupervised Pre-Training For Speech Recognition, arXiv:1904.05862v4 [cs.CL], Sep. 11, 2019, 9 pages.
Stevens, K.N., Relational Properties as Perceptual Correlates of Phonetic Features, In Proc. Eleventh Int. Conf. Phonetic Sciences, 1987, vol. 4, pp. 352-356.
Wang, et al., Unsupervised Pre-training of Bidirectional Speech Encoders via Masked Reconstruction, arXiv:2001.10603v2 [eess.AS], May 5, 2020, 6 pages.

(56) References Cited

OTHER PUBLICATIONS

Yang, et al., SUPERB: Speech processing Universal PERformance Benchmark, arXiv:2105.01051v4 [cs.CL] Oct. 15, 2021, 6 pages.
Zhang, et al., Pushing the Limits of Semi-Supervised Learning for Automatic Speech Recognition, arXiv:2010.10504v2 [eess.AS] Jul. 20, 2022, 11 pages.
Zhu, et al., Texygen: A Benchmarking Platform for Text Generation Models, arXiv:1802.01886v1 [cs.CL], Feb. 6, 2018, 4 pages.
Zhu, et al., Unpaired Image-to-Image Translation using Cycle-Consistent Adversarial Networks, arXiv:1703.10593v7 [cs.CV], Aug. 24, 2020, 18 pages.

* cited by examiner

SELF-SUPERVISED SPEECH REPRESENTATIONS BY DISENTANGLING SPEAKERS

STATEMENT REGARDING PRIOR DISCLOSURES BY THE INVENTION OR A JOINT INVENTOR

Aspects of the present invention have been disclosed by the inventors in the published paper arXiv:2204.09224, Entitled: "CONTENTVEC: An Improved Self-Supervised Speech Representation by Disentangling Speakers", by Qian et al. and submitted on Apr. 20, 2022. The following disclosure is submitted under 35 U.S.C. § 102(b)(1)(A).

BACKGROUND

The present invention relates generally to the field of speech processing and more particularly to techniques for providing self-supervised speech representations.

In recent years, self-supervised learning (SSL) has emerged as a state-of-the-art solution to many speech processing problems with relatively few annotated data. The basic idea of SSL in speech may be to train a speech representation network on large-scale unannotated corpora, with an objective to capture and elicit meaningful speech structures and information. The resulting speech representation may then be applied to the training of downstream tasks with a small amount of annotated data.

Speech SSL has demonstrated advantages in a surprisingly wide range of tasks. One of the primary foci of speech SSL may be on tasks that process the content of speech, which can include speech recognition, speech phone classification, speech content generation and the like. For these tasks, the most desirable speech representations may be the ones that can disentangle content information in speech from other interfering variations. However, this disentanglement may be difficult because removing interfering variations may cause the desirable content to also be removed. In most content related downstream tasks, the cost of losing content information far outweighs the advantage of disentangling speakers to remove interference.

SUMMARY

Embodiments of the present invention disclose a method, computer system, and a computer program product for providing a self-supervised speech representation. In one embodiment, audio input is received including speech utterances. A label sequence is generated from these speech utterances by a teacher label generator. A speech representation is generated of a partially masked version of the speech utterance using a speech representation network. The speech utterance is passed into two random transformations that alter only speaker information prior to the partial masking. A predictor will then predict the label sequence. In one embodiment, a performance-based assessment is made on a cross-entropy loss between the generated label sequence and a predicted label sequence.

BRIEF DESCRIPTION OF THE SEVERAL VIEWS OF THE DRAWINGS

These and other objects, features and advantages of the present invention will become apparent from the following detailed description of illustrative embodiments thereof, which may be to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
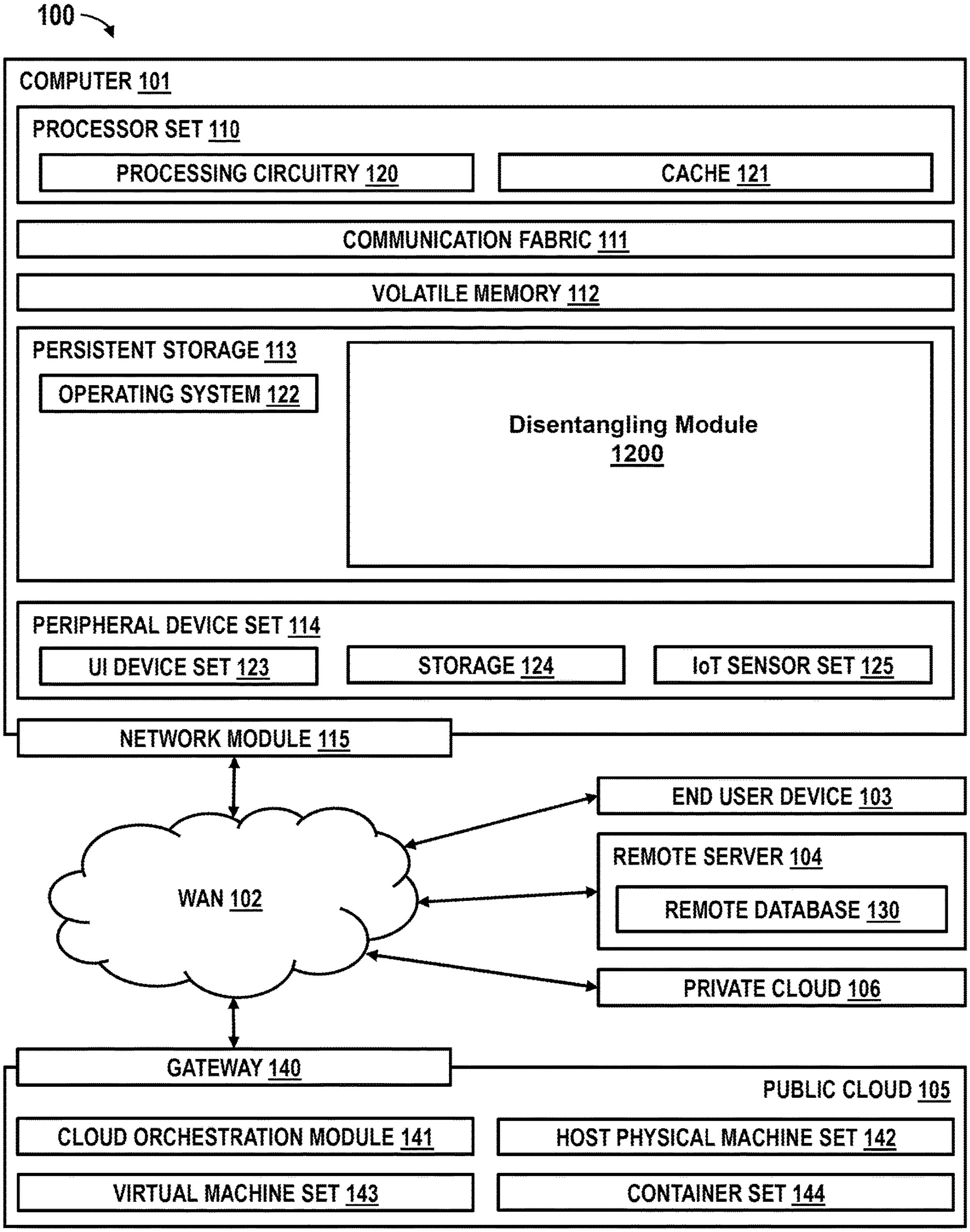
FIG. 1 illustrates a networked computer environment according to at least one embodiment.

Detailed embodiments of the claimed structures and methods may be disclosed herein; however, it can be understood that the disclosed embodiments may be merely illustrative of the claimed structures and methods that may be embodied in various forms. This invention may, however, be embodied in many different forms and should not be construed as limited to the exemplary embodiments set forth herein. Rather, these exemplary embodiments may be provided so that this disclosure will be thorough and complete and will fully convey the scope of this invention to those skilled in the art. In the description, details of well-known features and techniques may be omitted to avoid unnecessarily obscuring the presented embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 provides a block diagram of a computing environment 100. The computing environment 100 contains an example of an environment for the execution of at least some of the computer code involved in performing the inventive methods, such as code change differentiator which is capable of providing a disentangling module (1200). In addition to this block 1200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 1200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 of FIG. 1 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 1200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 1200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Self-supervised learning (SSL) in speech involves training a speech representation network on a large-scale unannotated speech corpus, and then applying the learned representations to downstream tasks. Since the majority of the downstream tasks of SSL learning in speech largely focus on the content information in speech, the most desirable speech representations should be able to disentangle unwanted variations, such as speaker variations and overlapping and background noise from the content. However, disentangling speakers is very challenging, because removing the speaker information could easily result in a loss of content as well, and the damage of the latter usually far outweighs the benefit of the former.

Figure 2:
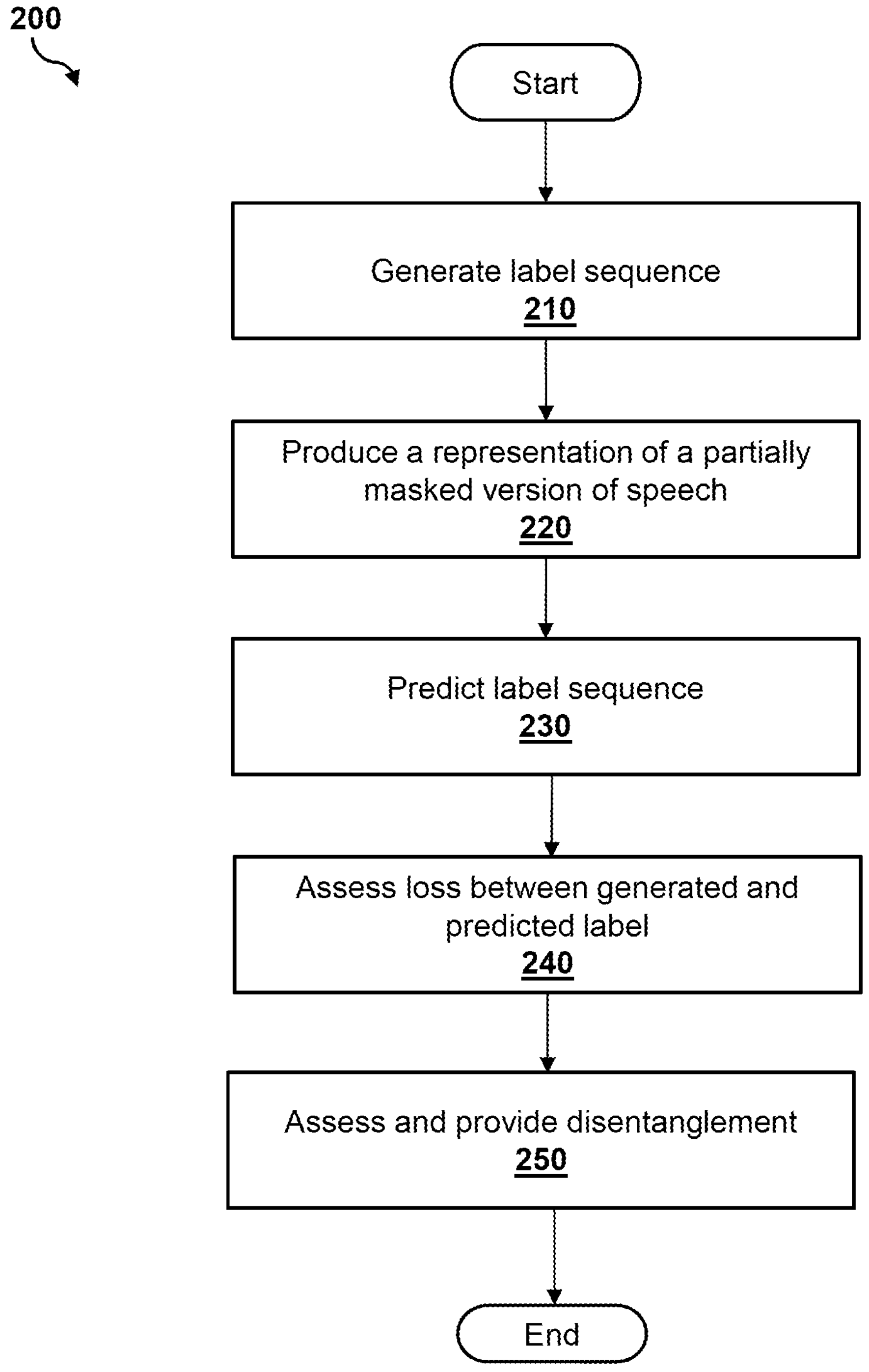
FIG. 2 provides an operational flowchart for a method using speech SSL according to one embodiment.
Figure 3:
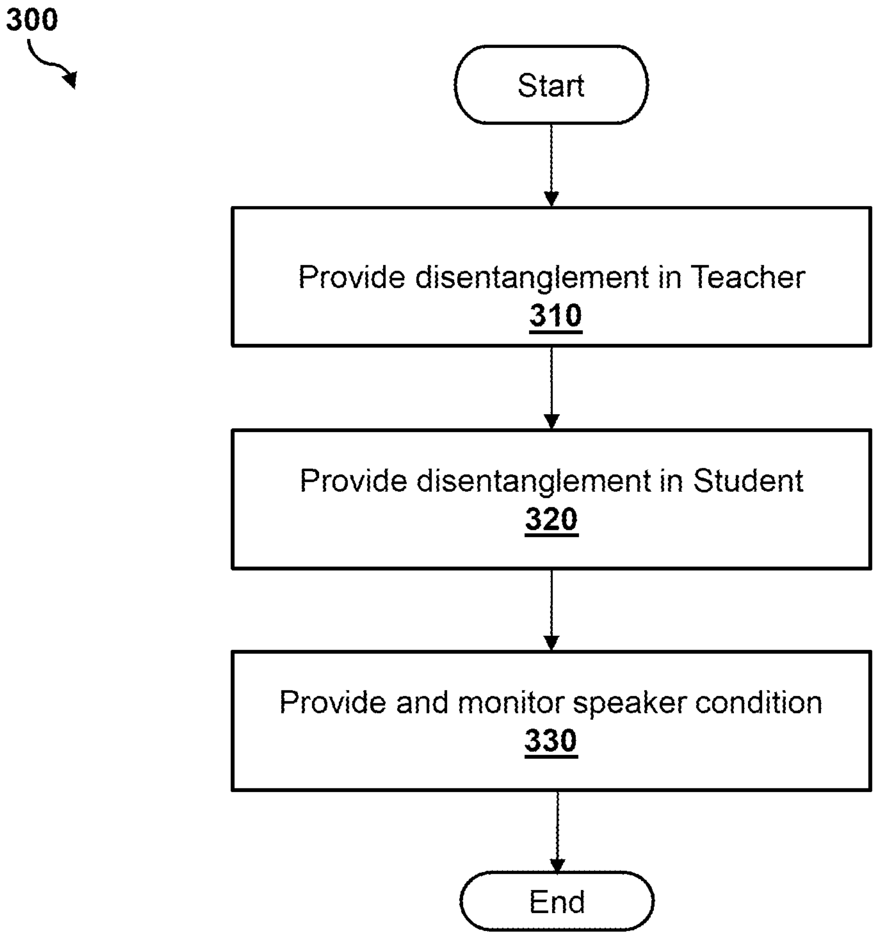
FIG. 3 provides an operational flowchart for disentangling sources according to one embodiment.

FIGS. 2 and 3 provide a new SSL method that can achieve speaker disentanglement and without severe loss of content. It incorporates disentangling mechanisms to regularize both the teachers (masked prediction labels) and the students (learned representations). In one embodiment, the benefit of speaker disentanglement is evaluated on a set of content-related downstream tasks. A consistent and notable performance is observed to determine the advantage of this speaker-disentangled representation.

Conventionally, SSL's self-training often involves a labeling technique that utilizes unlabeled speech and audio. This process may start with some supervised data to train a "teacher" model in one specific downstream task. The teacher uses K-means to generate labels, which does not require supervision. In the techniques provided herein as will be discussed in more detail, the training is unsupervised.

Next, a "student" model is trained using the combined supervised and teacher-labeled data. Note that the student only uses the labels from "teacher." Again, this ensures that the process does not require supervised data.

Now referring to FIG. 2, during Step 210, a label sequence may be generated from a speech utterance. In one embodiment this may be performed by a teacher label generator. The speech utterance may be converted to a single speaker. This may be then converted into speech representation(s) and ultimately quantized to discrete teacher labels.

Figure 4:
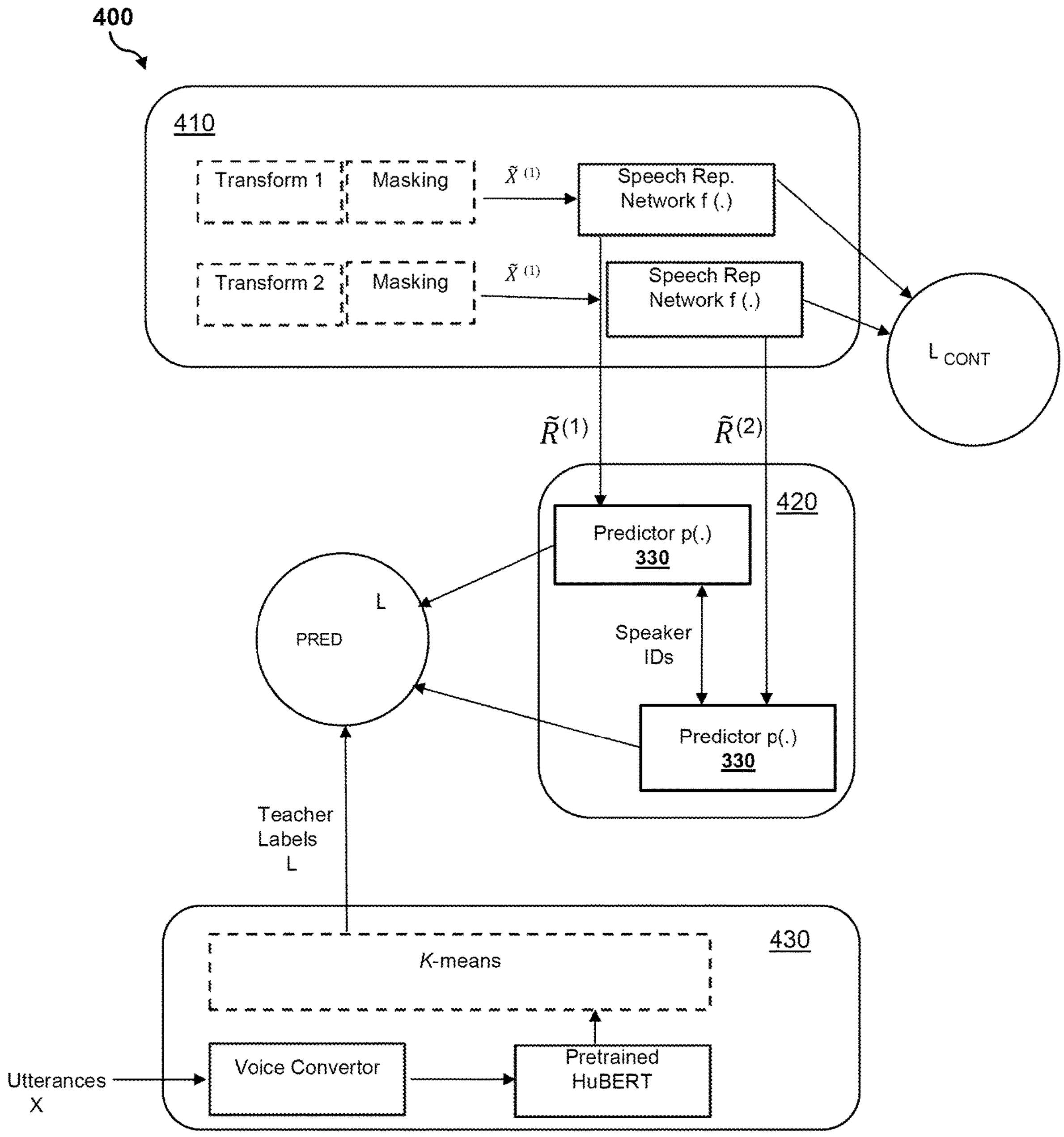
FIG. 4 provides a block diagram of a system that provides speech disentangling according to one embodiment.

In Step 220, a representation may be produced of a partially masked version of the speech utterance using a (speech representation) network (See FIG. 4). Similar to language modeling, a percentage of content may be masked at random so that the model can predict those masked portions based on other content. In this manner, partial masking can help progressively improve the learned discrete representation of speech between the real and predictive steps. Therefore, masking may be used here for learning speech representation, and random transformation may be used for speaker disentanglement. It may be better to provide these two procedures separately.

In Step 230, the label sequence will be predicted by a predictor using the output of the representation network.

In Step 240, the performance may be assessed based on a cross-entropy loss between the generated label sequence and the predicted label sequence. The objective may be for the predictive loss to be applied only over some regions (in one embodiment the masked regions) forcing the model to learn good high-level representations (of unmasked inputs) in order to infer the targets of other regions (masked ones) correctly.

In one embodiment, three modules are used to achieve the disentanglement process. These modules are the teacher module, the student module and a speaker module. FIG. 3 provides an example of how these modules can be used.

FIG. 3 provides a flowchart depiction of how the three disentanglement modules can function together. In one embodiment, all three modules are essential in shaping the speaker information flow across the speech representation network layers, and thereby achieve a superior disentanglement quality while keeping the content information intact.

In Step 310, a self-supervised learning model may be provided for speech that can achieve speaker disentanglement by providing a teacher disentanglement which obscures voice variations from the training target. In the teacher's modules, disentanglement may refer to removing the speaker information from the teacher labels.

In Step 320, the process provides a disentanglement in a student. This will obscure timbre and pitch variations using the representation network. Disentanglement in student modules may refer to introducing a regularization loss that directly enforce speaker invariance on the speech representations.

In Step 330 speaker condition may be provided. This will disentangle speaker information using the Predictor. Speaker conditioning modules may refer to inputting speaker information to the predictor so that the need for the speech representation to encode speaker information may be relieved. In one embodiment, speaker disentanglement may achieve a consistent performance advantage over the baseline speech representations on content-related applications.

In one embodiment, an Improved Self-Supervised Speech Representation by Disentangling Speakers framework may be established as seen in the block diagram of FIG. 4. For ease of reference, this framework will be referenced hereinafter as CONTENTVEC. This framework provides two advantages. First, it provides a way to disentangle speaker variations during SSL training without significant content loss. Second, there may be performance gain in SSL features contributed to downstream tasks.

In FIG. 4, the overall structure 400 may be similar to disentanglement module 1200. Structure 400 can be a representation of CONTENTVEC in one embodiment. In this scenario, the module 400 may be broken down into smaller modules 410, 420 and 430. The Networks are shown as solid boxes and Operations are illustrated by dashed lines. The loss terms are represented by circles.

In one instance in FIG. 4, a reference may be made to a hidden Unit Bidirectional Encoder Representation (HuBERT). HuBERT can be used in one embodiment to ease understanding, however, in alternate embodiments other components can be incorporated as appreciated by those skilled in the art.

HuBERT may be used because some of its practices can be used. For example, the continuous speech features are masked in both instances. Masking occurs randomly and loss (predictive loss especially) may be applied over the masked regions, to allow the model to learn representation of inputs. This allows both speech as well as other acoustic inputs to be learned.

In one embodiment, k-means mapping from audio inputs can be used to enable the sequencing structure of input data. In one embodiment, K-means mapping can be used. K-means clustering uses an algorithm that trains a model that groups similar objects together. The K-means algorithm accomplishes this by mapping each observation in the input dataset to a point in the n-dimensional space. In K-means clustering, each duster has a center. During model training, the k-means algorithm uses the distance of the point that corresponds to each observation in the dataset to the cluster centers as the basis for lustering. In some embodiments, random selection of k centroids may be made, where k may be equal to the number of clusters to be chosen. Centroids are data points representing the center of a cluster. The main element of the algorithm works by a two-step process called expectation-maximization.

In order to provide understanding of the solution presented, the following problem formulation can be used. First, it should be pointed out that upper-cased letters, X and X, are to represent random scalars and vectors, respectively, and lower-cased letters, x and x, are to represent deterministic scalars and vectors, respectively. Similarly, X=[X1, . . . , XT] as the sequence of a speech features, where Xt may be the speech feature vector at frame t, and T may be the total number of frames. The goal may be to learn a speech representation network R=f (X), where R=[R1, . . . , RT] and Rt may be the representation for frame t. R should desirably satisfy the following two properties:

R should preserve as much content information as possible, and the content information roughly corresponds to the phonetic/text transcriptions of the utterance; and R should be invariant across speaker variations.

There are three components:

1) the speech representation network f(•), 2) the predictor p(•), and 3) the teacher label generator g(•).

During training, the speech representation network takes the partially masked speech utterance, X̃ as the input, and produces a representation for the masked speech sequence, R̃=f(X̃). On the other hand, the teacher label generator generates a label sequence L=g(X) from the unmasked speech. The goal of the predictor may be to predict the teacher labels L from the masked speech representation of R̃. The teacher label generator g(•) may be usually predefined and fixed during training. The other two modules, f(•) and p(•) are trained jointly to minimize the following prediction loss:

$$\mathcal{L}_{pred}=E[\ell_m p\ o\ f(\tilde{X}),g(X)]$$

Where $\ell_m$ denotes the cross-entropy loss computed over the masked frames only. To make our description more intuitive, we will refer to f (X̃) as students, and g(X) as teachers.

Disentanglement in Teachers

Disentanglement in teachers aims to remove the speaker information in the teacher labels. In one embodiment, a voice conversion model may be provided to convert all utterances to the same speaker before generating the teacher labels.

Referring back to FIG. 4, at 430, the teacher labels, L=g(X), may be generated via the following three steps. First, all the utterances X in the training set may be converted to a single speaker using a competent unsupervised voice conversion system. Second, the converted utterances may be passed through a pre-trained unsupervised speech representation network, (in this scenario HUBERT), to generate a set of speech representations, which should contain very little speaker information. Finally, the speech representations may be quantized to discrete teacher labels using k-means clustering. It may be worth noting that although the teacher speech representation described above already achieves speaker disentanglement, its content preservation has not been satisfactory in some prior art instances because any voice conversion systems sometimes (for some speakers) cause a non-negligible content loss. Despite of this shortcoming of modern voice conversion, voice conversion may be used as a teacher to train better students, instead of directly applying its output to downstream tasks.

Disentanglement in Students

Disentanglement in students enforces speaker-invariant student representations, which can be achieved by using a contrastive-learning-based algorithm. Specifically, as shown in FIG. 4 at 410, each speech utterance, X, may be passed into two random transformations that alter only the speaker information, before it may be masked. Denote the two masked, transformed copies of X as $\tilde{X}^{(1)}$ and $\tilde{X}^{(2)}$. Then, this pair of utterances may be passed through the speech representation network, f(•), to generate the representations $R^{(1)}$ and $R^{(2)}$, and the following contrastive loss may be introduced to penalize dissimilarity between $R^{(1)}$ and $R^{(2)}$ as shown below.

$$\mathcal{L}_{contr}=\sum_{t=1}^{T}\frac{\exp\left(cossim\left(R_t{}^{(1)},R_t{}^{(2)}\right)/k\right.}{\sum\tau\varepsilon\{t\}U£_1\exp\left(cossim\left(R_t{}^{(1)}\right),R^{(2)}\right)/k}+\sum_{t=1}^{T}\frac{\exp\left(cossim\left(R_t{}^{(1)},R_t{}^{(2)}\right)/k\right.}{\sum\tau\varepsilon\{t\}U£_1\exp\left(cossim\left(R_t{}^{(1)}\right),R\tau^{(2)}\right)/k}$$

where cossim(•, •) denotes the cosine similarity, and a set of random time indices at which the representations may be chosen as the negative examples for time t. The contrastive loss consists of two terms so that it may be symmetric with respect to $R^{(1)}$ and $R^{(2)}$. According to the pair of equations above, the negative examples for the utterance pair, ($R^{(1)}$t, $R^{(1)}$t), may uniformly and randomly drawn from the remaining frames within the same utterances. As an extension to Equation above, the contrastive loss can be applied to an intermediate layer, instead of the final layer, of f(•). Later this may be discussed further as the choice of layer may be explored. The selection of which of the contrastive loss may be imposed would affect the disentanglement behavior. The biggest challenge of applying the contrastive loss may be how to design a random transformation that only alters the speaker identity of the utterance with minimal changes in the other aspects. To this end, a random transformation algorithm can be adopted. In one embodiment, the algorithm consists of three steps of transformations. First, all the formant frequencies within an utterance may be scaled by a factor of ρ1; second, F0 in every frame may be scaled by a factor of ρ2; finally, a random equalizer may be applied to accommodate any channel effects. ρ1 and ρ2 may be both randomly drawn from the uniform distribution μ([1, 1.4]), and then flipped to their reciprocals with probability 0.5. Since the majority of voice information resides in the formant frequency and F0 frequency ranges while content information resides in the relative formant frequency ratios, uniform scaling of all the formant and F0 tends to change the speaker information while retaining the content. The masked prediction task equation can be modified as:

$$\mathcal{L}_{pred}=E[\ell_m)p\ o\ f(\tilde{X}^{(1)}),g(X))+\ell_m(p\ o\ f(\tilde{X}^{(2)}),g(X))]$$

Again, the masked prediction loss is applied to both f($\tilde{X}^{(1)}$) and f($\tilde{X}^{(2)}$) for symmetry.

Speaker Conditioning

Although disentanglement in teacher can remove the majority of the speaker information from the teacher labels, certain speaker information would remain. As a result, the student representations may be undesirably forced to carry the same amount of speaker information as the teachers do in order to reasonably predict the teacher labels. To break this entailment between the speaker information in students and in teachers, the speaker embeddings may be fed to the predictor as shown in FIG. 4 at 420. Speaker embeddings may be produced by a speaker embedding network, in this scenario a pretrained speaker embedding a network (GE2E), which takes a speech utterance as input and outputs a vector summarizing the speaker information in the utterance. Therefore, by conditioning the predictor on the speaker embedding, we can supply whatever speaker information may be needed for the mask prediction task, so that the students do not have to carry the speaker information themselves. Formally, the masked prediction loss now becomes $$\mathcal{L}_{pred}=E[\ell_m)p(f(\tilde{X}_1),{}_8(X)),g(X)+\ell_m(p(f(\tilde{X}^{(2)}),{}_8(X)),g(X))]$$

Where s(X) denotes the speaker embeddings. The final loss is superposition of the prediction and contrastive losses:

$$\mathcal{L}=\mathcal{L}_{pred}+\lambda\mathcal{L}_{contr}$$

The descriptions of the various embodiments of the present invention have been presented for purposes of illustration but may be not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for providing a self-supervised speech representation, comprising:
- receiving audio input including speech utterances;
- generating a label sequence from said speech utterances by a teacher label generator;
- assessing performance based on a cross-entropy loss between said generated label;
- disentangling any speakers for masked prediction labels and disentangling one or more speakers for learned representations based on timbre and pitch variations using a representation network;
- disentangling any speakers for masked prediction labels or teacher labels so as to obscure voice variations from a training target;
- disentangling one or more speakers for learned representations or students so as to obscures timbre and pitch variations using the representation network;
- disentangling one or more speaker information using a predictor with speaker condition;
- producing a speech representation of a partially masked version of the speech utterance using a speech representation network, wherein the speech utterance is passed into two random transformations that alter only speaker information prior to the partial masking; and
- predicting said label sequence by a predictor.

2. The method of claim 1, wherein the speech utterances are converted to a single speaker and into speech representations.

3. The method of claim 2, wherein said speech utterances are quantized to discrete teacher labels.

4. The method of claim 2, further comprising:
- assessing performance based on a cross-entropy loss between said generated label sequence and a predicted label sequence.

5. The method of claim 1, wherein a learning model for speech utterances can be generated having a plurality of speakers.

6. The method of claim 5, wherein a subset of supervised data from said speech utterances are used to train a teacher model, and wherein Teacher labels provide a model that is a k-means trained model using just speech utterances without any supervision.

7. The method of claim 5, wherein a model is provided using teacher labels.

8. A computer system for providing a self-supervised speech representation, comprising;
- one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is enabled to perform following steps:
- receiving audio input including speech utterances;
- generating a label sequence from said speech utterances by a teacher label generator;
- assessing performance based on a cross-entropy loss between said generated label;
- disentangling any speakers for masked prediction labels and disentangling one or more speakers for learned representations based on timbre and pitch variations using a representation network;
- disentangling any speakers for masked prediction labels or teacher labels so as to obscure voice variations from a training target;
- disentangling one or more speakers for learned representations or students so as to obscures timbre and pitch variations using the representation network;
- disentangling one or more speaker information using a predictor with speaker condition;
- producing a speech representation of a partially masked version of the speech utterance using a speech representation network, wherein the speech utterance is passed into two random transformations that alter only speaker information prior to the partial masking; and
- predicting said label sequence by a predictor.

9. The computer system of claim 8, wherein the speech utterances are converted to a single speaker and into speech representations.

10. The computer system of claim 9, wherein said speech utterances are quantized to discrete teacher labels.

11. The computer system of claim 9, further comprising:
- assessing performance based on a cross-entropy loss between said generated label sequence and a predicted label sequence.

12. The computer system of claim 8, wherein a learning model for speech utterances can be generated having a plurality of speakers.

13. The computer system of claim 12, wherein a subset of supervised data from said speech utterances are used to train a teacher model, and wherein Teacher labels provide a model that is a k-means trained model using just speech utterances without any supervision.

14. The computer system of claim 12, wherein a model is provided using teacher labels.

15. A computer program product, comprising:
- one or more computer-readable storage medium and program instructions stored on at least one or more tangible storage medium, the program instructions executable by a processor, the program instructions comprising:
- one or more processors, one or more computer-readable memories, one or more computer-readable tangible storage medium, and program instructions stored on at least one of the one or more tangible storage medium for execution by at least one of the one or more processors via at least one of the one or more memories, wherein a computer system is enabled to perform steps comprising:

receiving audio input including speech utterances;

generating a label sequence from said speech utterances by a teacher label generator;

assessing performance based on a cross-entropy loss between said generated label;

disentangling any speakers for masked prediction labels and disentangling one or more speakers for learned representations based on timbre and pitch variations using a representation network;

disentangling any speakers for masked prediction labels or teacher labels so as to obscure voice variations from a training target;

disentangling one or more speakers for learned representations or students so as to obscures timbre and pitch variations using the representation network;

disentangling one or more speaker information using a predictor with speaker condition;

producing a speech representation of a partially masked version of the speech utterance using a speech representation network, wherein the speech utterance is passed into two random transformations that alter only speaker information prior to the partial masking; and predicting said label sequence by a predictor.

16. The computer program product of claim 15, wherein the speech utterances are converted to a single speaker and into speech representations.

17. The computer program product of claim 16, wherein said speech utterances are quantized to discrete teacher labels.

18. The computer program product of claim 16, further comprising:

assessing performance based on a cross-entropy loss between said generated label sequence and a predicted label sequence.

19. The computer program product of claim 15, wherein a learning model for speech utterances can be generated having a plurality of speakers.

20. The computer program of claim 19, wherein a subset of supervised data from said speech utterances are used to train a teacher model and teacher labels are generated for unlabeled data using said teacher model; and wherein said model is providing by training a combined supervised and teacher-labeled data subset and said labeling is iteratively repeated until an improved teacher label quality is provided.

* * * * *